May 21, 1957
C. M. FIXMAN ET AL
2,792,813
SERVO-OPERATED HYDRAULIC POWER SYSTEM
Filed April 17, 1956
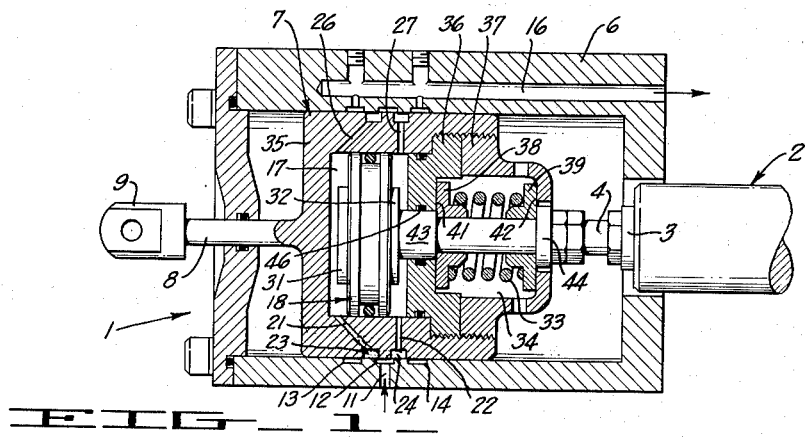
FIG_1_
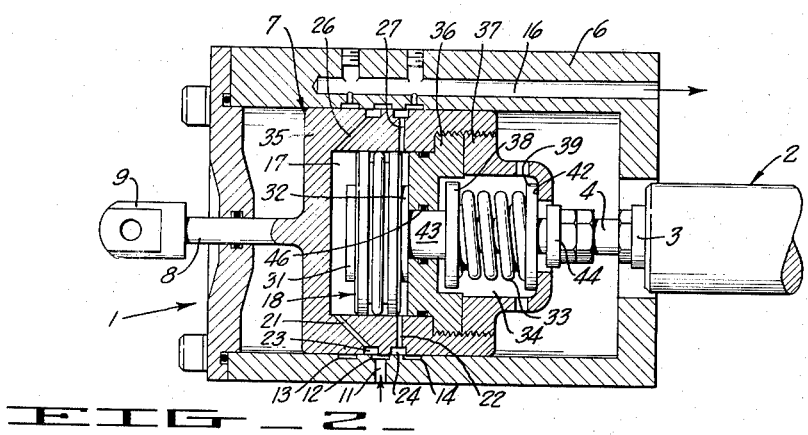
FIG_2_
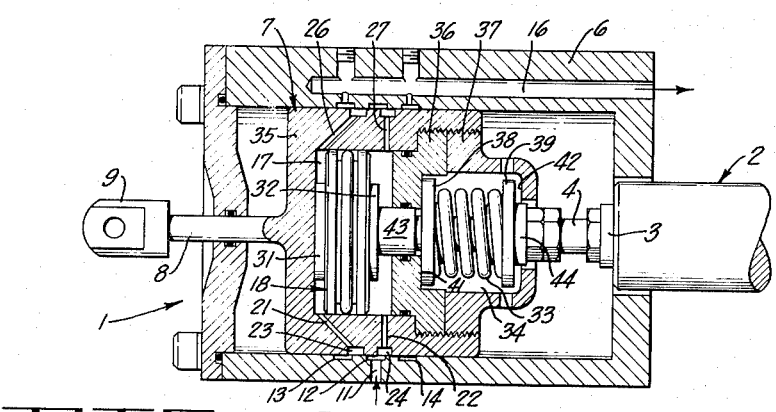
FIG_3_
INVENTOR.
Carl M. Fixman
Leonard J. Lucas
BY George Sipkin
Carl U. Critchlow

United States Patent Office 2,792,813
Patented May 21, 1957

2,792,813
SERVO-OPERATED HYDRAULIC POWER SYSTEM
Carl M. Fixman, Redwood City, and Leonard J. Lucas, Berkeley, Calif., assignors to the United States of America as represented by the Secretary of the Navy Application April 17, 1956, Serial No. 578,851

6 Claims. (Cl. 121—38)

(Granted under Title 35, U. S. Code (1952), sec. 266)

This invention relates to actuating mechanism and, in particular, to auxiliary mechanism for controllably modifying the response of a valve to an automatically-actuated valve drive.

The invention described herein may be manufactured and used by and for the Government of the United States of America for governmental purposes without the payment of any royalties thereon or therefor.

Mechanism of the type under consideration may find many applications but, as presently envisaged, it is specially suitable for use in controlling the movements of overlapped port valves which, by their very nature, should have their drive-responsive movement modified to a degree sufficient to minimize the effect of the overlap. Such a minimizing of the overlap is particularly desirable when the valve is used in a servo-operated fluid power system that employs a valve actuator arm which is responsive to a servo-signal generated in accordance with the demands of the system. For example, such valves are used rather conventionally to control a ship's rudder, such as rudders of the steering gear or the bow and stern driving gear, and the overlapping of the ports is utilized to assure an adequate seal between the main valve port and other auxiliary valve ports connected with the main valve.

On the other hand, although the provision of such a seal is most beneficial, it also is true that its advantages are somewhat offset by the fact that the relatively large overlap required for effectiveness introduces a so-called "dead-zone" in the servo system. In other words, when a suitably large overlap is employed, certain servo signal demands may not be met by any corresponding and appropriate transmittal of power because the valve movement responsive to the signal is not sufficient to unblock the overlap and open the necessary ports for passage of the fluid pressure.

This particular problem has been recognized and, in fact, it even can be said that these dead zones have been eliminated in some applications, although the means used to so eliminate them now appear unnecessarily complex and intricate. Thus, it is known that the overlap has been minimized by employing additional linkages in the servo system, and such linkages usually are shifted hydraulically or electrically as the main valve goes in and out of neutral position to modify the response of the valve to the servo signal to the extent that sufficient motion is added to the drive of the valve actuator arm to compensate the overlap. However, it is obvious that the incorporation of such additional linkages adds to the mechanical complexity of the servo system, and, further, the arrangement as a whole is such as demands close synchronization and constant attention if the system is to operate with the requisite precision and rapidity of response.

It is, therefore, an object of the present invention to provide an automatically-operating, valve-actuating mechanism which is capable of modifying the response of the valve to the extent that a certain amount of valve motion is automatically obtained independently of the drive of the valve's actuator arm. A related object is to provide a simple and reliable mechanism capable of accomplishing this result without relying upon relatively complex and power-driven shiftable linkages.

A more specific object is to provide a valve actuating mechanism capable of addingg a fixed amount of independent motion to the motion of a valve actuating arm which, in turn, has a movement that is commensurate with the servo signal of a servo-operated fluid power system.

A further object is to provide a mechanism in accordance with prior objects, the mechanism being capable of positively closing and opening an overlapped port valve substantially independently of the amount of movement of the valve actuating arm.

Still another object is to provide a valve mechanism in accordance with the last object, the mechanism being capable of positively centering the overlapped valve in its neutral position.

Generally, the objects of the invention are accomplished by coupling the valve actuator arm to the valve stem through a resilient link which either compresses or expands in direct response to the reciprocation of an indepenply movable fluid-pressure piston. Preferably, the fluid pressure piston is rigidly coupled to the valve stem so as to impart its drive directly to the stem, while the valve actuator arm is coupled to the valve stem only through the resilient link. The arrangement is such that the resilient link translates the motion of the actuator arm directly to the valve stem so that movement of the stem is commensurate with the arm. On the other hand, although the same resilient link normally resists any movement of the fluid pressure piston, when sufficient fluid power is applied to this piston, it is capable of compressing the link and producing additional stem motion. In other words, the compressibility causes the stem to move a particular distance which exceeds the driving movement of the valve actuator arm by an amount equal to the compression of the link. Thus, it is desired to assure that any slight servo-signal or other valve-operating signal immediately will produce a valve stem movement which is at least equal to the extent of the overlap because in this manner the "dead-zone" introduced by the overlap is effectively compensated or discounted.

In the preferred form of the invention, the application of the fluid pressure to the stem-coupled piston is responsive to movements of the valve actuator arm with the result that the slightest movement of this arm in one direction immediately ports the pressure to the piston and causes the resilient link to compress. Thus, the major initial movement of the valve stem is predominantly in response to the compression of the link instead of the magnitude of the signal that moves the actuator arm, and this initial movement normally will compensate for the overlap.

It also is to be noted that the initial compressive movement loads the resilient link so that, upon relief of the pressure on the piston, the valve stem and the piston are resiliently returned to normal position. This return, most suitably, takes place after the actuator arm has returned the valve stem a certain distance, and the purpose of the return is to regain the desired overlap. Another desirable feature of the invention is that the valve stem is positively held in a fixed normal position, which preferably is the overlapped position. Also, the stem is movable in either direction from this neutral position and the supplemental motion is imparted on the initiation of either bi-directional movement to unblock the overlap. However, the details of construction permitting the accomplishment of these particular functions are far more readily understood with reference to the drawings.

The preferred form of the invention is illustrated in the accompanying drawings of which Fig. 1 is a somewhat diagrammatic sectional elevation of the actuating mechanism illustrating its balanced or static condition in which the stem of the main valve is held in its closed and overlapped position; Fig. 2 a view similar to Fig. 1 in which the mechanism has moved the valve stem in one direction; and Fig. 3 another view similar to Fig. 1 in which the mechanism has moved the valve stem in the opposite direction.

Referring to the drawings, the actuating mechanism, which as a unit is represented by the numeral 1, is used to actuate a valve 2 and, for this purpose, the mechanism is coupled to stem 3 of this valve by means of a shaft or rod 4. The valve itself may be of any type desired and, in fact, any driven member for which the particular actuating mechanism might be adapted can be substituted for the valve. However, as presently contemplated, valve 2 is a servo-operated bidirectional, main power control valve used to control the flow of hydraulic pressure to accomplish such purposes as moving a ship's rudder. Also, such a valve normally includes auxiliary ports and it frequently is desirable to open these auxiliary ports while the main valve is in neutral position. Because of these plural ports of the valve, it has been found desirable to employ what is known as an overlapped port arrangement which is rather conventional and which, as can be surmised, is an arrangement in which there is a substantial overlapping seat provided between the ports primarily for the purpose of assuring an adequate seal capable of preventing inter-flow from one port to another. For example, in the present valve, it may be most desirable to prevent inter-flow when the main valve port is in neutral position and one of the auxiliary ports is open to perform a particular job. On the other hand, it also is known that substantial overlaps of this type introduce so-called dead-zones in the valve system and this is particularly true in servo-operated valve systems where the control valve is operated in accordance with a servo signal generated in response to the demands of the system. Thus, it is found that the servo response of the main valve sometimes is insufficient to compensate for the overlap so that there is produced an objectionable lag or possibly an entire failure of valve response. As has been indicated, actuating mechanism 1 of the present invention is provided primarily for the purpose of overcoming this objectionable lag produced by the dead zone and to accomplish this the actuating mechanism is of a type which assures a valve stem response that at least is sufficient to unblock the overlap.

The actuating mechanism illustrated in the drawings preferably includes a cylindrical casing 6 provided with a central bore in which is reciprocably mounted a piston-like member 7 provided at its rear end with an actuated arm 8 on which is mounted a link 9 for connecting the arm directly to a servo-drive. As may be noted, the rear wall of cylinder 6 is provided with a sealed opening through which arm 8 projects, while the front wall of this cylinder also has an opening into which valve 2 is inserted. Further, for purposes to be described later, cylinder 6 is provided with hydraulic fluid supply and exhaust ports 11, 12, 13 and 14, as well as a longitudinal bore 16 providing an exhaust line common to the exhaust ports. Generally, the provision of these ports is to circulate pressure within an interior chamber 17 formed in piston 7 and mounting pressure piston 18 which is, as should be noted, directly and rigidly coupled to main power control valve 2 by means of rod 4.

The hydraulic pressure, of course, reciprocates piston 18 and, to accomplish this purpose, it also is necessary to provide certain porting passageways through piston 7 communicating chamber 17. Accordingly, piston 17 is provided with supply passages 21 and 22, these passages having their outer ends enlarged to provide inlet recesses 23 and 24 capable of aligning with cylinder ports 12, 13 and 14. Similarly, piston 7 has additional bored passages 26 and 27 providing exhaust conduits opening into recesses 23 and 24 of the piston. As will be appreciated, recesses 23 and 24, as well as port recesses 12, 13 and 14, are formed annularly about the circumference of their respective piston or cylinder and the function of these ports will become obvious in the description which is to follow. For the present, it can be appreciated that the porting arrangement is such as to permit application of hydraulic pressure to either side of the piston for the purpose of driving the piston in one or the other direction, or, as seen in Fig. 1, to distribute the pressure equally to both sides of the piston. In fact, the normal disposition of piston 18 contemplates a balanced condition of the pressure to the extent that piston 18 remains in its centered position and is not driven to either side. Also, piston 18 is provided on its front and rear faces with outwardly-projecting discs 31 and 32, these discs providing stops which limit the piston stroke in either direction.

Another important feature of the invention is the use of a resilient member such as a spring 33 which, as may be seen, is disposed in another chamber 34 provided in the forward part of piston 7, this chamber also containing spring-abutment collars 38 and 39 which are slidably mounted on shaft or rod 4. To facilitate assembly of this spring arrangement within front chamber 34 and also to permit maintenance and repair, piston 7 preferably is formed in three parts, the rear part 35 being rigidly secured to actuating arm 8 and having its front end counterbored and threaded to receive a piston-retainer portion 36 that, in turn, is locked in place by a front keeper portion 37. As may be noted, spring collar 38 is of sufficient diameter to bear against a front face 41 of piston retainer member 36, while front spring collar 39 also bears against an inner-face 42 of front keeper portion 37.

Also to be noted is the fact that both front and rear spring collars 38 and 39 are engaged with rod 4 with the result that any movement of rod 4 is either direction carries one or the other of these keeper members with it. To engage the rod with the collars, rod 4 is provided with radial flanges 43 and 44, rear flange 43 fitting snugly but slidably in a bore provided in retainer member 36 and front flange 44 normally being disposed in a similar bore provided in the front face of keeper portion 37. Further, the projection of flange 43 through portion 36 necessarily is sealed by means of an O ring sealing member 46 used to prevent the escape of hydraulic pressure from rear chamber 17 into the front chamber. On the other hand, it, of course, is unnecessary to provide any seal for flange 44.

As a result of the engagement of flanges 43 and 44 with spring collars 41 and 42, it can be appreciated that any reciprocatory movement of piston 18 also carries one or the other of spring collars 38 or 39 with it. Such a movement is possible only if the hydraulic pressure applied to so move the piston is capable of overcoming the resilient force of the spring but, as would be expected, the relative strength of the spring is sufficiently limited to permit its necessary compressibility.

Such being the structure of the mechanism illustrated in the drawings, it now becomes pertinent to consider the manner in which the various elements cooperate to produce the desired result or, more specifically, to assure a sufficient movement in the main valve such as will compensate for the overlapped ports of this valve. The cooperation of these various elements best can be understood by considering the operation of the mechanism as a whole, although before doing so, it might be helpful to broadly note the general arrangement provided by this assembly. Thus, it may be recalled that piston 18 is rigidly coupled to main power control valve 2 by means of rod 4 so that any movement of the piston is imparted directly to the main valve. On the other hand, piston 7 is not directly connected to main valve 2, although, because of a link provided by spring 33 and its associated elements, movement of piston 7 in response to the servo signal of arm 8 also will move rod 4 and valve 2. Specifically, the link just mentioned is formed because of the fact that spring collar 38 engages both face 41 of piston member 36 and radial flange 43 of rod 4 while, at the other end of the spring assembly, collar 39 engages or links together both face 42 of piston 7 and radial flange 44 of the rod. As a result of the linking together of the rod and the piston by means of the spring collars, any movement to the right or to the left of the piston will produce an equivalent amount of movement in stem 4 of the valve. Thus, even though spring collar 38 might move yieldably away from its face 41, any movement to the right of piston 7 nevertheless will find collar 39 following its face 42 for imparting its following movement to radial flange 44 to move rod 4 to the right. Of course, the reason spring collar 39 follows or maintains its engagement with face 42 is due to the pressure exerted on the spring collar by spring 33. Similarly, any movement to the left of piston 7 will result in collar 38 maintaining its engagement with both face 41 and flange 43 so as to carry the rod to the left.

The particular operation of this mechanism can best be understood with reference to the several figures of the drawings. Fig. 1, for example, represents a balanced or static condition of the mechanism in which the main power control valve is disposed in its neutral position or, in other words, in a position of maximum port overlap. At this particular time, hydraulic pressure is being admitted through cylinder port 11 and annular recesses 12 to ports 21 and 22 so as to produce an equalization of fluid pressure on both faces of piston 18. The equalization of pressure is assured by permitting flow between the faces of the pistons or such an interflow proceeding through port 26, recess 12 and port 27. At the same time, piston 18 is being positively held in its centered position by means of spring 33 because, as can be noted, spring 33 has pressed its collar members to their outermost extent and any motion of piston 18 can be obtained only by overcoming the spring force. As a result, the main valve is held in a position of maximum overlap and this position cannot be varied until sufficient pressure is generated to overcome the force of spring 33.

Fig. 2 represents the positions of the various elements after hydraulic pressure has forced piston 18 to its right-hand limit and also after arm 8 has moved piston 7 a certain distance to the right. Preferably, the movement to the right is initiated first by a slight movement of arm 8 which will be responsive to a servo signal generated within the hydraulic power system. This movement of arm 8 to the right causes recess 23 of port 21 to align with supply port 11 so as to deliver the pressure to one side only of the piston. At the same time, port 27 and recess 24 align with exhaust port 14 so as to permit the fluid in the exhaust side of the piston to be drained off. As a result, it will be appreciated that, in immediate response to even a very slight movement of arm 8 there is a correspondingly greater movement of piston 18 which, due to its rigid coupling with the valve, immediately moves the valve this increased distance. As has been indicated, the distance which the valve will move is sufficient to cause immediate unblocking of the overlap in its ports. Also, it is obvious from what has been said, that the hydraulic pressure applied to piston 18 is sufficient to overcome the resilient force of spring 33 so that any movement to the right under the influence of piston 18 produces a loaded condition in this spring which is utilized when the mechanism is to be returned to its neutral position. It also is apparent that any continued movement of arm 8 to the right will continue to move the main valve due to the previously-described resilient link formed between piston 7 and rod 4 of the main valve.

Fig. 3 illustrates the position of the various elements after pressure has been applied to the right-hand side of piston 18 to move this piston to the left and also to move the valve stem to the left. Thus, commencing with the neutral or static position of Fig. 1, it probably will be apparent that this left-hand movement follows precisely the same steps as the right-hand movement just described. Initially, movement of arm 8 to the left causes recess 24 of port 22 to align with pressure supply port 11 so as to introduce the pressure to the right-hand side of piston 18.

Similarly, alignment of other ports permits the left-hand side of piston 18 to be exhausted. The immediate consequence of this application of differential pressure to the piston is a movement of rod 4 to the left against the resilient force of spring 33 which then yields and permits the desired movement. Any further movement to the left of rod 8 also carries rod 4 to the left because of the link previously described. Additionally, the spring again becomes loaded and the loaded condition is utilized in returning piston 18 to its normal Fig. 1 position.

In the return of piston 18 from either the Fig. 2 or the Fig. 3 positions to the static position of Fig. 1, the first return movement will be entirely in response to the movement of arm 8 which exerts its force on rod 4 because of the resilient link provided between piston 7 and rod 4. However, when the return movement has disposed piston 7 in such a position that the supply entering port 11 distributes itself to both sides of piston 18, the pressure on both sides of this piston then becomes equalized and at this time the loaded condition of spring 33 takes over with the result that piston 18 will be spring-pressed from its extreme right or left-hand position back to its normal position. Consequently, the return of piston 18 to its centered position carries with it the stem of valve 2 and disposes this stem in a position of the desired maximum overlap. Further, as previously explained, this position of maximum overlap will be retained by spring 33 until pressure again is applied to one or the other sides of piston 18.

It now should be clear that the present mechanism accomplishes its desired purposes in a relatively simple and thoroughly reliable manner. Thus, any signal initiating a movement of the control valve immediately is translated into a movement of actuating arm 8 but, even if the initial movement of arm 8 is not sufficient to unblock the overlap of the valve, the immediate application of fluid pressure to piston 18 will add a particular amount of movement to the valve such as will assure the unblocking of this overlap. As was stated at the beginning of this description, a similar result previously was accomplished through the medium of relatively complicated mechanical linkages which were under the influence of separate or hydraulic or electrical controls. The present mechanism requires no such mechanical linkages and instead accomplishes the results by utilizing a resilient spring and hydraulic pressure capable of compressing this spring. Another important feature which bears careful consideration is the fact that the arrangement which permits the movement of the actuating arm to be supplemented also assures a positive centering of the main valve in its desired neutral position. Other obvious advantages of the mechanism are found in its compact and space-saving arrangement and also in the facility with which the mechanism can be assembled or disassembled for maintenance purposes. On the other hand, it is not anticipated that the mechanism will require any substantial degree of maintenance because there are no wearing parts and the parts which are used do not require precise constant adjustments.

Obviously many modifications and variations of the present invention are possible in the light of the above teachings. It is therefore to be understood that within the scope of the appended claims the invention may be practiced otherwise than as specifically described.

We claim:

1. Actuating mechanism for reciprocating the stem of a main valve, said mechanism including an independently-reciprocable piston normally disposed in a predetermined position, means reciprocably coupling said valve stem with said piston, a second piston, driving means for reciprocating said second piston, resilient means linking together said two pistons for unitary movement responsive to said driving means, said resilient means being compressible for yieldably permitting said independent movement of said first piston, means for supplying fluid pressure to said first piston, said supply means providing sufficient pressure for compressing said resilient means whereby said independent movement is permitted, and control means for closing off said pressure supply means when said driving means disposes said second piston in a predetermined position, said control means permitting said compressible means to move said first piston independently into its normal position.

2. Actuating mechanism for reciprocating the stem of a main valve, said mechanism including an independently-reciprocable piston normally disposed in a predetermined position, means reciprocably coupling said valve stem with said piston, a second piston, driving means for reciprocating said second piston, resilient means linking together said two pistons for unitary movement responsive to said driving means, said resilient means being compressible for yieldably permitting said independent movement of said first piston, and fluid-pressure supply means arranged to distribute pressure equally on both sides of said first piston when said first and second pistons are disposed in a predetermined relative position and to provide a pressure differential on said first piston upon displacement from said predetermined position, said supply means providing sufficient pressure differential for compressing said resilient means whereby said independent movement permits displacement of said piston from its predetermined relative position, and said equalized pressure distribution permitting said compressible means to return said displaced first piston into said predetermined relative position, said resilient link yieldingly holding said pistons in said predetermined position.

3. Fluid pressure actuating mechanism for reciprocating the stem of a main valve, said mechanism including a reciprocably-mounted spool formed with an interior cylinder chamber, an actuator arm for reciprocably driving said spool, a piston reciprocably mounted in said spool cylinder, fluid pressure means for reciprocating said piston independently of said spool, a shaft reciprocably coupling said valve stem with said piston, and mechanical means for returning said piston from a reciprocated position into a normal disposition in said cylinder; said fluid pressure means being arranged to distribute pressure equally to both sides of the piston when said spool is disposed in a normal disposition and to produce a pressure differential on said piston upon movement of said spool from said normal disposition whereby said piston is driveably reciprocated and said spool drive is supplemented by the piston drive; and said mechanical means including compressible means resiliently maintaining said piston in said normal disposition within its chamber, said means compressibly yielding to said piston pressure differential whereby said piston is moveable, and said movement resiliently loading said compressible means for positively returning said piston to its normal disposition when said spool movement causes the piston pressure equalization.

4. Fluid pressure actuating mechanism for reciprocating the stem of a main valve, said mechanism including a reciprocably-mounted spool formed with an interior cylinder chamber, an actuator arm for reciprocably driving said spool, a piston reciprocably mounted in said spool cylinder, fluid pressure means for reciprocating said piston independently of said spool, a shaft reciprocably coupling said valve stem with said piston, and mechanical means for returning said piston from a reciprocated position into a normal disposition in said cylinder, said fluid pressure means being arranged to distribute pressure equally to both sides of the piston when said spool is disposed in a normal disposition and to produce a pressure differential on said piston upon movement of said spool from said normal disposition whereby said piston is driveably reciprocated and said spool drive is supplemented by the piston drive; and said mechanical means including compressible means having end portions abutting said spool for resiliently maintaining said piston in said normal disposition within its chamber, said means compressibly yielding to said piston pressure differential whereby said piston and stem shaft are moveable independently of said spool, and said movement resiliently loading said compressible means for returning said piston to its normal disposition when said spool movement causes the piston pressure equalization, said compressible means end portions further forming a link between said spool and said shaft for transmitting movement of said spool to said shaft whereby said linked members move in unison.

5. Fluid pressure actuating mechanism for reciprocating the stem of a main valve, said mechanism including a casing, a spool formed with an interior chamber and mounted in said casing, a reciprocable actuator arm for reciprocating said spool, a piston reciprocably mounted in said spool chamber, a shaft reciprocably connecting said valve stem with said piston, fluid pressure means for controlling said piston movement, and mechanical means urging said piston into a normal disposition in said cylinder, said fluid pressure means including a pair of pressure inlets arranged to equalize pressure on both sides of the piston when said actuator arm disposes said spool in a normal disposition relative to said casing, said pressure means also producing a pressure differential on said piston upon movement of said spool from said normal disposition whereby said piston is driveably reciprocated and said spool movement is supplemented by the piston drive; and said mechanical means including a pair of spaced-apart abutment collars loosely mounted on said stem-connecting shaft, a resiliently compressible spring disposed between said collars, inner and outer collar-engaging flanges rigidly carried by said shaft, said shaft flanges bearing against said loosely-mounted collars for relatively moving said collars an amount corresponding to the pressure-responsive movement of said piston-driven shaft, whereby said spring is compressed sufficiently for returning said piston to its normal position when said actuator arm returns said spool to its normal pressure-equalizing position.

6. Fluid pressure actuating mechanism for reciprocating the stem of a main valve, said mechanism including a casing, a spool formed with an interior cylinder chamber and mounted in said casing, a reciprocable actuator arm for reciprocating said spool, a piston reciprocably mounted in said spool chamber, a shaft reciprocably connecting said valve stem with said piston, fluid pressure means for controlling said piston movement, and mechanical means urging said piston into a normal disposition in said cylinder, said fluid pressure means including a pair of pressure inlets arranged to equalize pressure on both sides of the piston when said actuator arm disposes said spool in a normal disposition relative to said casing, said pressure means also directing the pressure to one side only upon movement of said spool from said normal disposition whereby said piston is driveably reciprocated and said spool movement is supplemented by the piston drive, and said mechanical means including a pair of spaced-apartment abutment collars loosely mounted on said stem-connecting shaft, a resiliently compressible spring disposed between said collars, inner and outer collar-engaging stops rigidly carried by said spool, and inner and outer collar-engaging flanges rigidly carried by said shaft, said shaft flanges bearing against said loosely-mounted collars for relatively moving said collars an amount corresponding to the pressure-responsive movement of said piston-driven shaft, whereby said spring is compressed sufficiently for returning said piston to its normal position when said actuator arm returns said spool to its normal pressure-equalizing position, and said engagement of said spool stops with said collars providing a resilient link between the spool and the shaft for moving said shaft in response to said actuator arm.

No references cited.